Aug. 28, 1945.   H. HORNSCHUCH   2,383,862
SEALING DEVICE
Filed Dec. 13, 1943

INVENTOR
Hanns Hornschuch.
BY
HIS ATTORNEY.

Patented Aug. 28, 1945

2,383,862

UNITED STATES PATENT OFFICE 2,383,862

SEALING DEVICE

Hanns Hornschuch, Easton, Pa., assignor to Ingersoll-Rand Company, New York, N. Y., a corporation of New Jersey Application December 13, 1943, Serial No. 514,045

4 Claims. (Cl. 286—7)

This invention relates to sealing devices for centrifugal pumps and the like, and more particularly to that type of sealing device known as mechanical seals comprising rotary and nonrotary components that operate to valve a small amount of liquid between them for minimizing wear upon their sealing surfaces.

One object of the invention is to provide a sealing device of the mechanical type that will require only a small space for its accommodation.

Another object is to simplify the construction and minimize the cost of the sealing device so that it may be conveniently serviced and any of its parts, when worn excessively, may be replaced at a low cost.

Other objects will be in part obvious and in part pointed out hereinafter.

Figure 1:
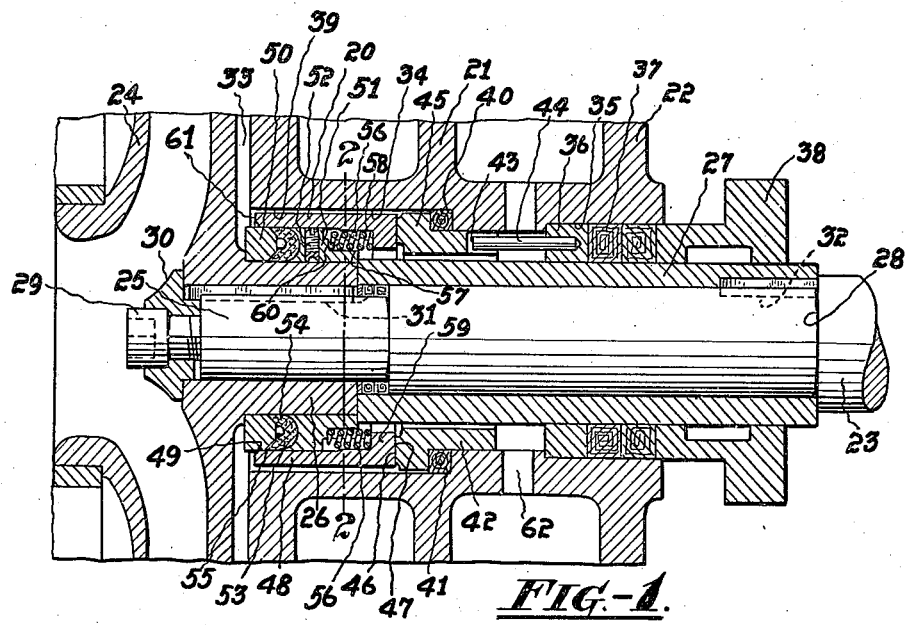
Figures 2, 3:
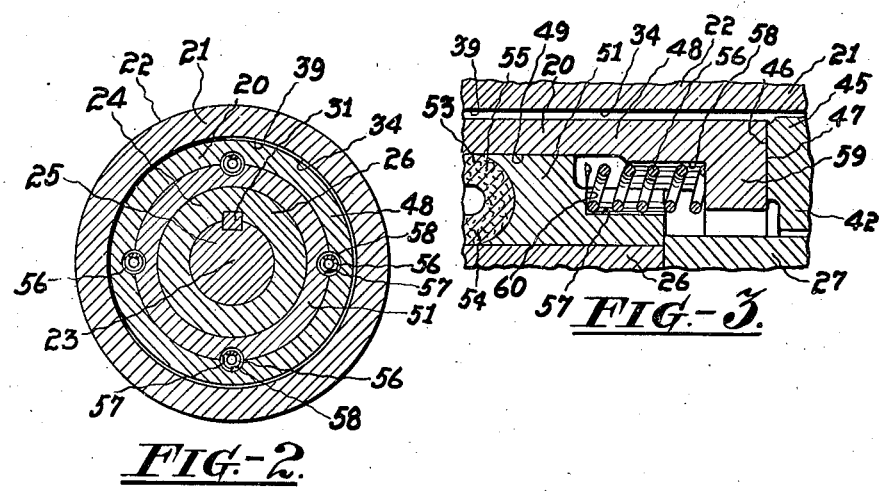

In the drawing accompanying this specification and in which similar reference numerals refer to similar parts, Figure 1 is a longitudinal elevation, partly in section, of a sealing device constructed in accordance with the practice of the invention and showing it applied to the rotor of a centrifugal pump, Figure 2 is a transverse view taken through Figure 1 on the line 2—2, and Figure 3 is an elevation, in section, illustrating the manner in which the rotary member of the sealing device is locked to the pump rotor for rotation therewith.

Referring more particularly to the drawing, 20 designates, in general, a sealing device, constructed in accordance with the practice of the invention, and 21 a centrifugal pump embodying the sealing device.

The pump comprises a casing 22 having a shaft 23 extending horizontally therethrough and an impeller 24 mounted upon an end 25 of the shaft. The hub 26 of the impeller is pressed against an end of a wearing sleeve 27, on the shaft 23, and the sleeve 27 is pressed against a shoulder 28 on the shaft 23 by a screw 29 threaded into the end 25 of the shaft and acting against a cap 30 overlying the outer end of the impeller hub 26. The impeller 24 is additionally secured to the shaft by a key 31, and a key 32 is imbedded in the sleeve 27 and the shaft to assure against relative rotary movement between the two.

The pump is shown as being of the overhung type having a single pumping chamber 33, and a bore 34 leads from the pumping chamber to the end of the casing 22 to receive the shaft 23 and the sleeve 27. The outer end of the bore constitutes a stuffing box 35 and contains a ring 36 that acts as an abutment for packing material 37 which may be compressed by a gland 38 for preventing leakage from the end of the bore 34 and along the surface of the sleeve 27.

The portion of the bore 34 adjacent the pumping chamber 33 is somewhat enlarged and serves as a chamber 39 for the accommodation of the sealing device 20. At its innermost end is a shoulder 40 and a packing member 41 seats against the shoulder and embraces a sealing ring 42 loosely encircling the sleeve 27 to prevent leakage of liquid along the wall of the bore. The sealing ring 42 has a notch 43 at its outer end for engagement with a pin 44 seated in the ring 36 for holding the sealing ring 42 against rotary movement and has an external flange 45 that bears at one end against the sealing member 41. The opposite or free end of the flange 45 constitutes a sealing surface 46 that cooperates with a similar surface 47 on a sealing sleeve 48 encircling the impeller hub 26 to seal the chamber 39.

The sealing sleeve 48 is of smaller diameter than the chamber 39 so that liquid may flow freely from the pump chamber 33 to the sealing surfaces 46 and 47. It is movable longitudinally of the shaft for adjustment relatively to the sealing ring 42 and its inner surface 49 is slidable upon a guide ring 50 and a collar 51 on the hub 26 and lying entirely within the sealing sleeve. The guide ring 50 may be attached to the hub in any well known manner, as for example by a press fit, and the collar 51 has a slide fit on the hub 26 and is secured thereto by a set screw 52 for securing it fixedly to the hub 26.

The guide ring 50 and the collar 51 are spaced with respect to each other to receive therebetween a plastic cuppacking ring 53 the inner lip 54 of which engages the surface of the hub 26 and the outer lip 55 bears against the inner surface of the sleeve 48 to prevent leakage of fluid through the sealing sleeve 48. The opposed surfaces of the collar 51 and the guide ring 50 are suitably shaped to conform with the surfaces of the packing ring 53 against which they bear.

The sealing sleeve 48 is the rotary member of the sealing device and rotary movement is transmitted from it to the collar 51 by helical compression springs 56 that have portions of their peripheral surfaces imbedded in the collar 51 and in the sealing sleeve 48. The collar is accordingly provided in its periphery with a series of longitudinally extending, partly-circular grooves 57 to receive the springs and conform substantially to the curvature of their coils. Similarly shaped grooves 58 are also formed in the inner surface of the sleeve 48 adjacent the flange 59 carrying the sealing surface 47 to engage the outer surfaces of the springs. The open end portions of the latter grooves overlie the corresponding portions of the grooves 57 and a coil, or coils, of the intermediate portions of the springs lies in both grooves to form a strong driving connection between the sleeve 48 and the collar 51.

The springs seat at one end against the flange 59 and at their other ends against shoulders 60 at the inner extremities of the grooves 57. Their normal length is greater than the distance between the flange 59 and the shoulders 60 so that they will be compressed at all times to urge the sealing surface 47 against the sealing surface 46, and their force is augmented by the pressure of the fluid in the pumping chamber 33 acting against the adjacent end 61 of the sealing sleeve 48.

The surfaces 47 and 61 are of such areas that the springs 56 and the pressure of the fluid acting against the surface 61 will yield only in such degree to the pressure gradient between the surfaces 46 and 47 as to permit of the passage of only a sufficient amount of liquid between the sealing surfaces to lubricate them.

In order that the liquid thus valved between the sealing members may pass freely from the bore 34 the casing 22 is provided with a suitable outlet 62 that may communicate directly with the atmosphere or be connected, as by a conduit (not shown), with the source of liquid supply. The outlet 62 is located between the opposed ends of the sealing ring 42 and the ring 36, as a preferred arrangement.

In practice the present invention has been found to be particularly well suited for use as a sealing device between the stationary and rotary parts of centrifugal pumps. It is of short overall length and, therefore, requires only a small space in the pump casing. Moreover, by placing the springs within the sealing sleeve and well out of the path of the fluid stream there will be no danger of their action being hindered by solids entrained in the liquid.

I claim:

1. In a sealing device, the combination of a casing and a rotor therein, a pair of sealing members having surfaces to cooperate with each other for effecting a seal, means for holding one sealing member against rotary movement, and helical springs for transmitting rotary movement from the rotor to the other sealing member and to press it into sealing engagement with the said one sealing member and having intermediate portions thereof interlocked with the said other member and the rotor.

2. In a sealing device, the combination of a casing and a rotor therein, a pair of sealing members having surfaces to cooperate with each other for effecting a seal, means for holding one sealing member against rotary movement, a collar on the rotor, and helical springs having intermediate portions thereof partly imbedded in the collar and the other sealing member for transmitting rotary movement from the rotor to said other sealing member and acting to press it into sealing position.

3. In a sealing device, the combination of a casing and a rotor therein, a non-rotary sealing member in the casing to encircle the rotor, a sleeve encircling the rotor and having a surface to engage the sealing member for effecting a seal, and helical springs carried by the rotor and having intermediate portions thereof connected with the rotor and the interior portion of the sleeve to transmit rotary movement from the rotor to the sleeve.

4. In a sealing device, the combination of a casing and a rotor therein, a non-rotary sealing member to encircle the rotor, a sleeve encircling the rotor and having a surface to engage the sealing member for effecting a seal, a collar on the rotor, there being partly-circular slots in opposed surfaces of the sleeve and the collar to register with each other and having portions lying in the same transverse plane, and helical springs in the slots to transmit rotary movement from the rotor to the sleeve and to press the surface on the sleeve into sealing engagement with the sealing member.

HANNS HORNSCHUCH.